Nov. 10, 1964    J. E. McEVOY    3,156,411
VALUE ENTERING DEVICE USEFUL FOR MIXED NUMBERS
Filed Jan. 9, 1964    8 Sheets-Sheet 1

INVENTOR.
Joseph E. McEvoy
BY
William W. Holton Jr.
ATTORNEY

INVENTOR.
Joseph E. McEvoy
BY
William W. Holloway Jr.
ATTORNEY

Nov. 10, 1964 J. E. McEVOY 3,156,411
VALUE ENTERING DEVICE USEFUL FOR MIXED NUMBERS
Filed Jan. 9, 1964 8 Sheets-Sheet 5

INVENTOR.
Joseph E. McEvoy
BY
William W. Jollow Jr.
ATTORNEY

Nov. 10, 1964   J. E. McEVOY   3,156,411
VALUE ENTERING DEVICE USEFUL FOR MIXED NUMBERS
Filed Jan. 9, 1964   8 Sheets-Sheet 8

INVENTOR.
Joseph E. McEvoy
BY William W. Dalton Jr.
ATTORNEY

[United States Patent Office — 3,156,411 — Patented Nov. 10, 1964]

3,156,411
VALUE ENTERING DEVICE USEFUL FOR
MIXED NUMBERS
Joseph E. McEvoy, Stamford, Conn., assignor to
Pitney-Bowes, Inc., Stamford, Conn., a corporation
of Delaware
Filed Jan. 9, 1964, Ser. No. 336,841
24 Claims. (Cl. 235—60)

This invention relates to a so-called "ten-key keyboard" type mechanism with which values are entered into a value-indicating means and/or a value-registering means as are utilized in adding machines, postage-metering machines and the like. This invention is particularly useful when the settable values involve, not only a whole number in each of one or more denominational orders, but also a fraction which is less than the difference between two successive whole numbers of the lowest one of said denominational orders. For example, if three denominational orders are provided as the units, the tens and the hundreds denominational orders, respectively, each fraction is less than the difference between the successive whole numbers "1" and "2" of the units order, less than the difference between the successive whole numbers "5" and "6" of the units order, etc.

The value-indicating means is otherwise known as an item indicator or itemizer, and indicates the value of each item to be entered into the value-registering means. The value-registering means is otherwise known as an accumulator, and registers the total value of a series of entered items.

This application is a continuation-in-part of prior copending application Serial No. 268,898, filed March 29, 1963, now abandoned which latter application is a continuation-in-part of prior application Serial No. 83,750, filed January 19, 1961, now abandoned.

Each time anyone of the keys of a conventional ten-key keyboard type mechanism is operated to enter the designated value of that key, that designated value is indexed into the lowest denominational order and simultaneously the designated value of any previously operated key is indexed from whatever denominational order it occupied into the next higher denominational order. A mechanism incorporating the present invention departs from such a conventional mechanism in that no such indexing occurs when particular values, such for example as fractions, are entered.

With the first disclosed embodiment of the present invention, a keyboard is provided which includes a group of whole number keys ("0" through "9") in addition to a fraction key ("½"). Each time any one of the keys is operated, a particular control element is set. When the fraction key is operated, the set control element is positioned to control entry of the fractional value into the value-indicating means and to control later entry of the fractional value into the value-registering means. When one of the whole number keys is operated, however, the set control element indexes one space to the lowest denominational order whereby the set control element is positioned to control entry of the respective whole number into the lowest denominational order of the value-indicating means and to control later entry of the respective whole number into the lowest denominational order of the value-registering means. When a second whole number key is operated during an amount setting operation, another control element is set and indexed to the lowest denominational order as before, and the previously set control element is indexed one space from the lowest denominational order to the next higher denominational order. With this indexing of said previously set control element to said next higher denominational order, the value represented by the first whole number key that was operated is entered into said next higher denominational order of the value-indicating means and said previously set control element is positioned to control later entry of the same value into said next higher denominational order of the value registering means.

After a particular value has been set by operation of one or more of the keys, any whole number values in the respective denominational orders and any fractional value, all as then entered into and indicated by the indicating means, are entered into the value registering means under the control of the set control elements.

With the second embodiment of the invention as disclosed herein, operation of the mechanism is substantially the same as that of the first disclosed embodiment except that particular values such as fractions are entered by first operating a conditioning or setup key for preventing subsequent actuation of said indexing means and then operating one of the same keys used for entering the whole number values.

One advantage of the embodiments disclosed herein is that fractions are entered as such rather than as decimal equivalents. With the United States form of currency, for example, an operator may not know that the decimal equivalent of ½ cent is .005 dollar. Another advantage is that the decimal equivalents of many likely-to-be-used fractions require more than one denominational order to be expressed. For example, the decimal equivalent of ¼ requires two denominational orders and the decimal equivalent of ⅓ requires an infinite number of denominational orders.

Accordingly, an object of the present invention is the provision of a new and improved device for entering values into a value indicating means and/or into a value registering means.

Another object of the invention is to provide such a device which accommodates a whole number in each one of a plurality of successive denominational orders and at least one fraction which is less than the difference between two successive whole numbers in the lowest one of said denominational orders.

A further object of the invention is the provision of such a device which incorporates indexing means and which requires an amount of space, in the direction of indexing, less than that required by conventional devices.

Another object of the invention is the provision of such a device which incorporates a so-called ten-key keyboard type of mechanism and wherein certain of the keys are locked out against operation whenever a fraction is entered or entry of a fraction is initiated. Still another object is the provision of such a device wherein depression of an operating cycle trip means is effective to lock-out all of the number keys of the keyboard.

Further objects and advantages will become apparent as the description proceeds.

Several embodiments of the invention are shown in the accompanying drawings wherein.

In the embodiment of the invention shown in FIGS. 1–9 of the drawings, the mechanism includes a stationary keyboard unit 10 and a movable carriage unit 11 which is adapted to be released for transverse indexing movement.

Figure 1:
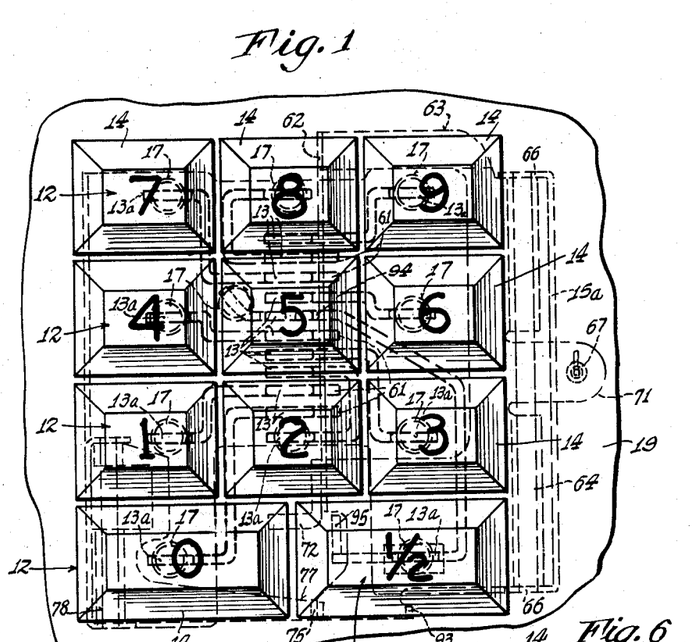
FIG. 1 is a plan view of the keyboard arrangement according to a first embodiment of the invention.
Figure 2:
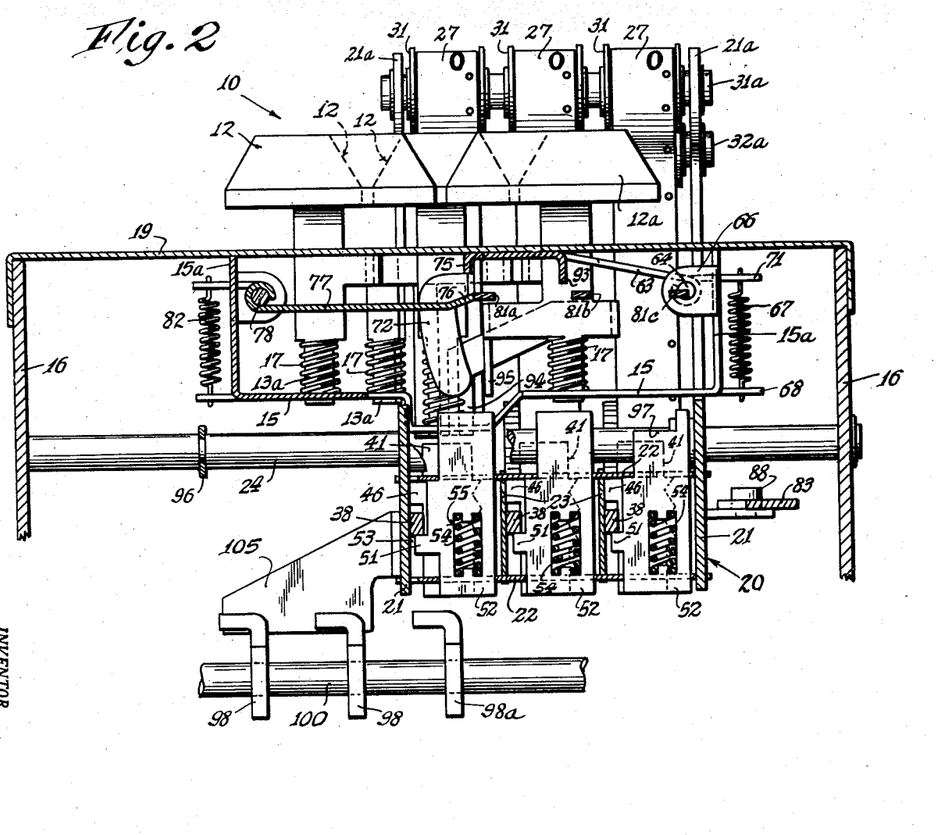
FIG. 2 is an elevational view taken in section along the line 2—2 in FIG. 3 and in the direction of the arrow 2 in FIG. 1.

In the keyboard unit, ten whole number keys 12 and one fraction key 12a are positioned for convenient manual operation, as best shown in FIG. 1. Each whole number key comprises an actuating stem 13, with a push button 14 fixed to a sideward and upward extension thereof. The key stems 13 are equally spaced one behind the other and are freely guided within slots 18 in a support 15. Said support 15 has ends 15a, 15a (FIG. 2) fixed within a cover plate 19 and carried by a frame 16. Each of the key stems 13 is fixed to an extension 13a about which a compression spring 17 is disposed for yieldingly urging each of the keys upwardly as best shown in FIGS. 1 and 2. Each stem extension 13a is also slidable in a slot 18 in support 15, and the upper end of each stem 13 is slidable in a slot 18 in the support 15.

The carriage unit 11 comprises a support indicated generally at 20, FIG. 2, which includes vertical side walls 21, 21 joined by upper and lower plates 22, 22 to provide an open ended boxlike structure. Intermediate reinforcing walls are provided at 23, 23. Said support 20 is slidably mounted on horizontally disposed rods 24 and 25 which extend through openings in the walls 21, 21. The rods 24 and 25 are supported by the main frame 16.

Figure 4:
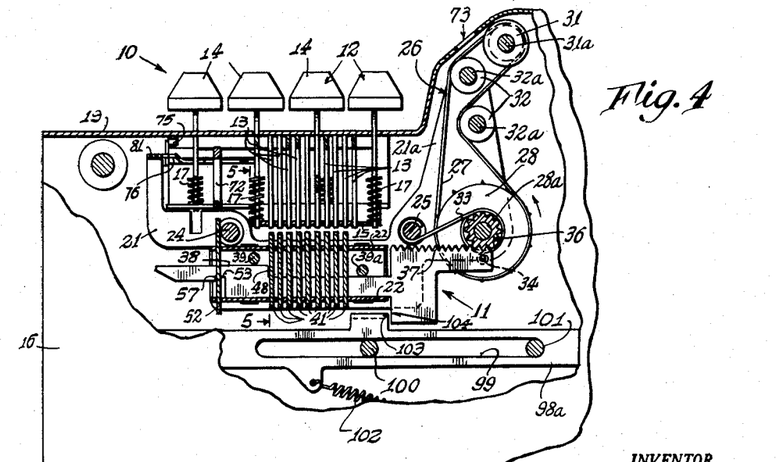
FIG. 4 is an elevational view taken in section along the line 4—4 in FIG. 3.

The side walls 21, 21 are extended rearwardly and upwardly as at 21a, 21a for the support of value indicating elements generally indicated at 26, FIG. 4. Said indicating elements comprise value bearing tape loops 27 which are carried by driven toothed sprocket pulleys 28 at the lower portions thereof, pulleys 31 at the uppermost portions thereof and intermediate pulleys 32, 32. The pulleys 31 and 32 rotate about shafts 31a, 32a which are supported by the side walls 21, 21.

The toothed sprocket pulleys 28 are adapted to be driven in a counterclockwise direction, as viewed in FIG. 4, by torsion springs 33. Each spring 33 has its body portion supported on a sprocket pulley hub 28a, has one end fixed to the sprocket pulley 28, as at 34, and has the other end fixed to the rod 25.

Pinions 36, fixed to each of the sprocket pulleys 28, mesh with toothed racks 37. Each rack 37 has a forward extension 38 which passes through the open ends of the carriage support 20. The lower edge of each rack bar extension 38 bears against the surface of the lower plate 22 and the upper edge is guided by guide rods 39, 39a.

Figure 5:
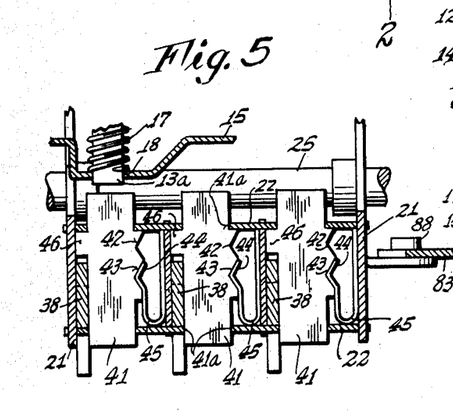
FIG. 5 is an elevational view taken in section along the line 5—5 in FIG. 4.

Included in the box-like portion of the support 20 is a plurality of control units, two of which include nine vertically slidable and key settable control elements in the form of pins or rack stop bars 41 and one of which includes only one such control element. See FIGS. 3, 4 and 5. Each stop bar 41 has its upper and lower ends extending through and guided within openings 41a, 41a in the upper and lower plates 22, 22 of the carriage support 20. The right side edge of each stop bar, as viewed in FIG. 5, is notched to provide upper and lower detent notches 42, 43 with which detent portions 44 of yieldable detent springs 45 are adapted to engage. Engagement with the lower notch 43 is effected when a stop bar 41 is in its normal or upwardly projecting position, as shown in FIG. 5.

The lower end of the stem 13 of each whole number key 12 is disposed directly over one of the nine stop bars 41 at the left-hand side of the carriage unit 11 when the carriage unit is in its initial or returned position (FIGS. 2, 4 and 5). It will be apparent that depression of the "0" key will effect depression of the first rack stop bar 41, depression of the "5" key will effect depression of the sixth rack stop bar 41, and depression of the "9" key will not effect depression of a rack stop bar 41 because the rod 39a acts as a stop when the "9" key is depressed, etc.

Each rack 37 is latched in its normal home position, FIG. 4, by means of a latch bar 52. As best shown FIGS. 2 and 4, a lug 51 projects from the left side of each latch bar 52 into a notch 53 within the extension 38 of the rack. Each latch bar 52 is slidably positioned within the upper and lower plates 22, 22 of the support 20 at the forward end thereof, and is urged upwardly by means of a compression spring 54. The spring 54 is retained within an opening 55 in the latch bar and is seated on the lower plate 22 of the support 20.

Depression of the latch bar 52 will cause the lug 51 to be removed from the notch 53 and from a shoulder portion 57 of the rack extension 38 thus freeing the rack 37 for operating movement to the right (as viewed in FIG. 4), as effected by the spring driven pulley 28 and attached pinion 36. The rack will move until the shoulder 48 of the tail portion 38 engages the lug 46 of the depressed rack stop bar 41. Said limitation of rack movement will thus limit the rotation of the pinion 36 and pulley 28 to thereby limit the movement of the number bearing tape 27 accordingly. The pin 41 next adjacent the respective shoulder 48 permits only an insignificant amount of movement of the respective rack 37 (to set the value "0"). As previously noted, the rod 39a provides a stop in place of a tenth or "9" stop bar.

Actuation of a latch bar 52 is effected when any one of the keys is depressed, in a manner which will now be described.

Each whole number key has a portion 61 of its stem structure extending over and engaging the upper edge of a bar 62. See FIGS. 1 and 6. The bar 62 forms a bridge between the ends of a U-shaped universal tripping member 63 which is pivotally supported on a rod 64. See also FIG. 3. The rod 64 is mounted between two ears 66, 66 extending from the support 15. A spring 67, FIGS. 1 and 2, connected between an extended portion 68 of the support 15 and an extended portion 71 of the universal tripping member 63, urges the bar 62 against all of the key stem extensions 61. Also forming a part of the tripping member 63 is a trip finger 72 which, when the tripping member 63 is depressed through operation of a whole number key, will engage and depress one of the latch bars 52, as best seen in FIG. 2. The depression and release of any whole number key, therefore, will effect the release of one of the racks 37 and the value indicating element 26 associated therewith.

During rack and indicating element movement, a whole number on the respective indicator element, which whole number agrees with the whole number key depressed, moves to a reading position behind a window 73 of a value-indicating section 74 of the machine casing. When a whole number moves to a reading position the carriage indexes one step to the left in a manner now to be described.

During the depression of a whole number key, a downwardly bent lip 75 of the tripping member 63, will move into engagement with the free end 76 of a carriage stop finger 77. See FIGS. 2 and 7a. Said stop finger 77 has its opposite end pivotally supported on a rod 78 carried by one end 15a of the support 15 and is normally urged to a stop position relative to the first tooth 81a of an indexing comb 81 by a spring 82. See FIGS. 2 and 3. When the stop end 76 of the stop finger 77 is released from said tooth 81a, as in FIG. 7a, the carriage 11 will be urged to the left, by means of a spring urged lever 83.

Figure 3:
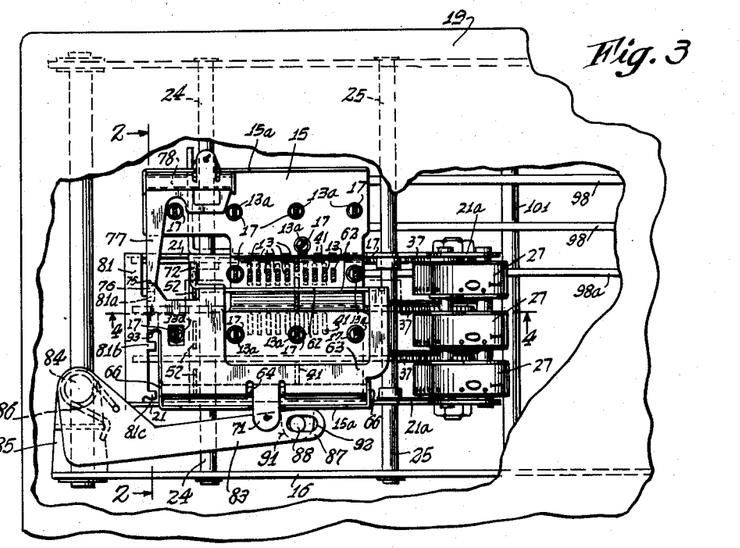
FIG. 3 is a plan view taken directly under the cover plate of the device and showing portions of the key stems in section.

As best seen in FIG. 3, the lever 83 is pivotally mounted on a stud 84, supported within a bracket 85 and mounted on the main frame 16. A torsion spring 86 has one end anchored to the bracket 85 and the other end anchored to the lever 83 to urge the free end 87 of lever 83 to the left in a counterclockwise direction about the stud 84. A pin 88 extending upwardly from an ear 91 on the carriage support 20, extends through an elongated slot 92 in the free end 87 of said lever 83. Therefore, when the carriage stop finger 77 is removed from its stop position relative to the tooth 81a, the carriage will be moved by the spring urged force of the lever 83 a distance determined by a downwardly projecting stop 93 on the tripping member 63. The end 76 of the stop finger 77 now lies beneath the tooth 81a, as in FIG. 7b, and will move into the path of the next tooth 81b, as in FIG. 7c, when the key button 14 is released and returns to normal position. The stop 93 will also move upwardly from its stop position while the key button 14 returns to normal position and the indexing movement will continue until the tooth 81b engages the end 76 of the stop finger 77, as in FIG. 7d.

Now the key stems 13 are aligned with a second set or row of rack stop bars 41 which are associated with a second rack 37 and indicating element 26 to the right of the previously actuated rack (as viewed in FIG. 2).

Figure 9:
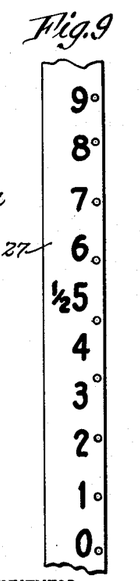
FIG. 9 shows a detail view of the location of the whole numbers and a fraction on a portion of an indicator tape.

The number bearing tape loops 27 have numbers printed on the exposed faces thereof, as best indicated in FIG. 9. Whole numbers "0" through "9" are provided in one continuous row and the fraction "½" is provided at the left of the number "5."

A plurality of value-indicating windows 73 are provided by the casing of the machine as shown in FIGS. 4 and 8a through 8d. Two whole numbers windows 73a, 73a are provided, each of which is contiguous with an opaque portion (formed by a solid portion of the casing) to the left of the respective window as viewed in FIGS. 8a through 8d. When any tape loop 27 is disposed behind one of the windows 73a, 73a, a respective one of the whole numbers "0" through "9" on that tape loop will be exposed by that window and the respective opaque portion to the left of that whole number window will prevent exposure of the portion of the tape to the left of that respective whole number. A fraction window 73b is provided which is contiguous with an opaque portion to the right of this fraction window. When any one of the tape loops 27 is disposed behind the fraction window 73b the latter lies in the path of the fraction "½" on that tape loop and the opaque portion to the right of the fraction window will prevent exposure of the whole numbers on that tape loop.

Figure 8A:
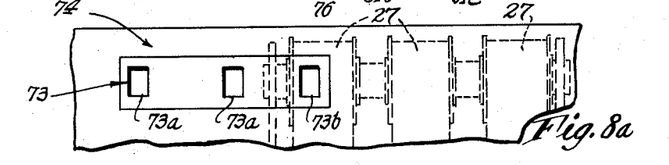
FIGS. 8a–b–c–d show detail operational views of the windows or reading line of the value indicating means and particularly showing the manner of indexing and the placing of two whole numbers and a fraction in a reading position.
Figure 8B:
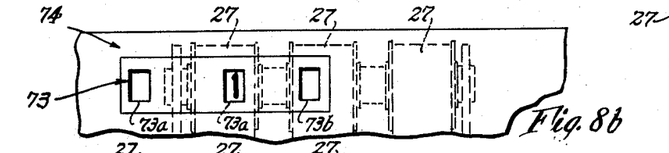
Figure 8C:
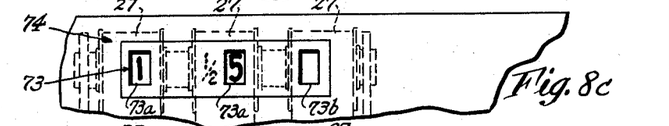

In operation, let it be assumed that the carriage unit 11 is in its returned position and that the value "15" is to be set. The whole number key 12 which represents the value "1" is depressed thereby moving the lower end of the stem 13 of this key against the second rack stop bar 41 from the left (as viewed in FIG. 4) of the first row of rack stops bars to depress this rack stop bar. Also, the sideward extension 61 of this key stem depresses the trip bar 62 whereupon the latch bar 52 associated with this first row of rack stop bars 41 releases the associated rack 37 for movement to the right (as viewed in FIG. 4) until the shoulder 48 of this rack is stopped by the depressed rack stop bar 41 with the number "1" on the associated tape loop 27 transversely aligned with the three windows 73a, 73a and 73b. When the "1" key is released, the carriage unit indexes one space to the left (as viewed in FIGS. 2 and 8a through 8d) to bring the whole number "1" on the first tape loop 27 to a position behind the window 73a which represents the lowest denominational order as shown in FIG. 8b. The "5" key is then operated by being depressed and released, and the same operation takes place except, of course, that the sixth rack stop bar 41 is depressed whereby the number "5" appears in the window 73a which represents the lowest denominational order. Also, and as shown in FIG. 8c, when the number "5" was indexed to the window 73a of the lowest denominational order, the number "1" was indexed from the window 73a of lowest denominational order to the window 73a of next higher denominational order. It is to be noted that, although the fraction "½" is alongside the number "5" in the lowest denominational order, the opaque portion to the left of the respective window 73a prevents exposure of this fraction so that an observer can see only the number "5" in the lowest denominational order. Without more, then, the value "15" has now been set.

Figure 6:
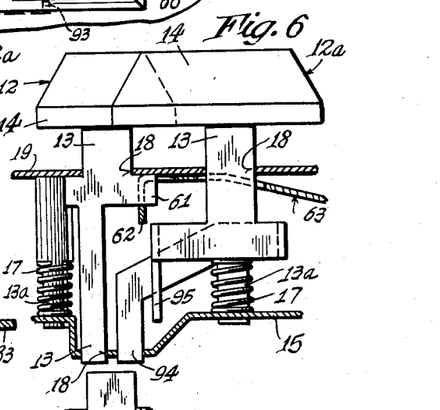
FIG. 6 is an elevational view partly in section and showing the "5" and "½" keys in operative relation with a stop bar.
Figure 7A:
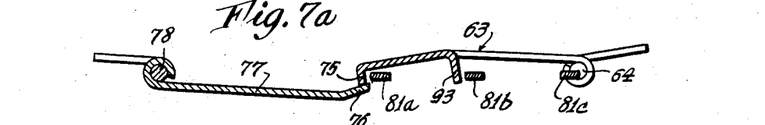
FIGS. 7a–b–c–d show detail operational views of tripping and indexing members with parts shown in section.
Figure 7B:
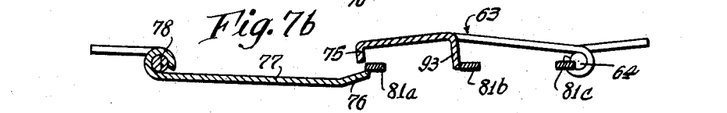
Figure 7C:
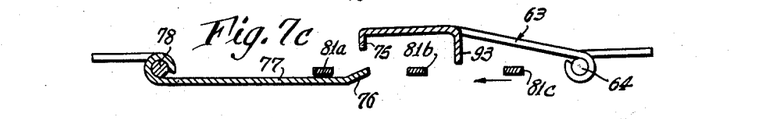
Figure 7D:
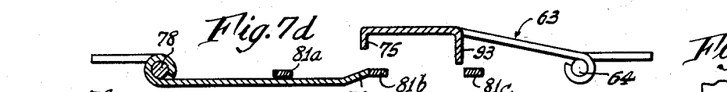

The structure and function of the mechanism for setting a fraction will now be described. Referring to FIGS. 2 and 6, the stem 94 of the fraction key 12a, unlike the stem 13 of each of the whole number keys 12, does not have a stem extension 61 which overlies the trip bar 62. Rather, the stem 94 of the fraction key by-passes the trip bar 62 and has an extension 95 that directly depresses the respective latch bar 52 (see FIG. 2 along with FIG. 6). As a consequence, depression of the fraction key releases the then associated rack 37, but no indexing of the carriage unit takes place (it being recalled that indexing of the carriage unit and tripping of the respective latch bar 52 are effected by tripping of the trip bar 62 each time a whole number key is depressed).

Figure 8D:
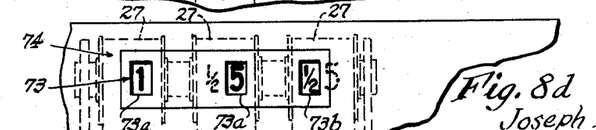

It will be noted in FIG. 6 that the stem 94 of the "½" key 12a is located alongside the stem 13 of the "5" key so that depression of the "½" key will depress the sixth stop bar 41 (from the left as viewed in FIG. 4) of the respective group of stop bars just as will depression of the "5" key. Consequently, the then associated tape loop 27 will move to bring both the "½" and the "5" on the tape loop into alignment with the row of windows 73a, 73a and 73b. However, since no indexing of the carriage unit takes place when the "½" key is operated, the "½" and the "5" on that tape loop 27 move to a position adjacent the fraction window 73b. As shown in FIG. 8d, the window 73b exposes the fraction "½" on that tape loop 27 and the opaque portion to the right of the window 73b prevents exposure of the number "5" so that an observer can see only the fraction "½."

The value "15½" is set in the machine by successively operating the "1" key, the "5" key and the "½" key, as described above. Logically, the fraction key, if it is operated at all, is the last key to be operated during any value setting operation. If a fourth key is operated for any reason, it will have no effect because all three of the racks 37 will have moved to a stopped position and the carriage is prevented from indexing due to the engagement of the left-hand side-wall 21 of the carriage unit 11 (as viewed in FIG. 2) with a stop 96 which can take the form of a spring clip seated in a groove in the shaft 24.

It will be noted that only a single stop bar 41 is disposed below the two rows of nine stop bars (as viewed in FIG. 3). This is the case because only two whole numbers can be set in the machine during any one value-setting operation; the third number, if set in the machine, necessarily being the fraction "½," and only one stop bar being required for this. If the "5" key were inadvertently operated after two whole number keys had been operated, the lone stop bar 41 would be depressed but this would have no effect because the latch bar 52 associated with the rack 37 to be stopped by the lone stop bar is notched out at its upper end as shown at 97 in FIG. 2 whereby the trip finger 72 fails to depress this latch bar thereby failing to release the associated rack 37 for movement. The extension 94 of the "½" key, when this key is depressed, will depress this latch bar 52, however, by striking the unnotched upper end portion of the latter.

If, for example, the fraction key 12a were the first key to be operated in a value-setting operation, the respective stop 41 of the first group of stop bars 41 would be depressed so that, upon release of the fraction key, the fraction "½" would appear in the window 73b. As would be obvious to one skilled in the art, conventional means could be provided to "lock-out" the keyboard against further operation of any of the keys during a value-setting operation once the fraction key has been operated.

The above description covers operation of the mechanism of the first embodiment for value setting and value indicating. Value registering will now be described with reference to FIGS. 2, 3 and 4. A plurality of register units are provided, each register unit taking the form of a register actuator. A separate register actuator 98 is provided for each of the denominational orders, and a register actuator 98a is provided for the fraction. All three of the register actuators provide a slot 99 within which are disposed two transverse rods 100, 101 for slidably supporting the register actuators. The rods 100, 101 are supported at their ends by the frame members 16. Each of the register actuators is resiliently biased, as by a tension spring 102, to the right as viewed in FIG. 4. Each of the racks 37 is provided with a shoulder 103, and each of the register actuators is provided with a shoulder 104. After a value has been set in the machine by the operation of one or more of the keys 12 and 12a, all of the register actuators 98 and 98a are released whereupon each register actuator moves to the right under the force of the respective spring 102 until the shoulder 104 thereof engages and is stopped by the shoulder 103 of a respective one of the racks 37 then aligned with that register actuator. Consequently, each register actuator for which a key was operated moves to the right a distance equal to that previously moved by the respective rack. Each register actuator is operatively arranged in a conventional manner to drive a respective gear-toothed register wheel or other counter element (not shown) a number of units corresponding to the distance it moved when released, whereupon the value set into the machine is entered into the value registering means.

A conventional stop for the register actuators 98, 98 is provided to prevent rightward movement of the register actuator of any one of the denominational orders when no key has been operated to set a value ("0" through "9") in that denominational order. This stop takes the form of a bracket 105 (FIG. 2) secured to the sidewall 21 of the carriage unit 11. With the carriage unit 11 in its returned, initial position as shown in FIG. 2, movement of the register actuators 98, 98 upon release of all of the actuators is prevented by stop 105. Of course, if no key 12 or 12a is operated before releasing the register actuators, the latch bar 52 of the first row of aligned stop bars 41 prevents the first rack 37 from moving and this prevents the register actuator 98a from moving. If only one whole number key 12 is operated before releasing all of the register actuators, the stop 105 will be indexed with the carriage unit 11 the space of one denominational order thereby permitting subsequent movement of the middle register actuator 98 (for the lowest denominational order) while still retaining the left-hand register actuator 98 (as viewed in FIG. 2) against movement when all of the register actuators are otherwise released.

Fractions other than "½" can be provided for by utilizing an additional key similar to the key 12a for each one. For example, if the fractions "¼" and "¾" were to be provided for in addition to "½," depression of the fourth stop bar 41 of each group of aligned stop bars would be effected by operating the "¼" key, depression of the seventh stop bar would be effected by operating the "½" key (instead of the sixth stop bar as in the embodiment shown in the drawing), and the guide rod 39a would provide the stop for the rack 37 when the "¾" key was depressed. The register actuator 98a, when released, would move three units of distance if the fourth stop bar 41 was depressed, six units if the seventh stop bar was depressed, and nine units if the guide rod 39a provided the stop. By way of example, the register actuator could drive a twelve-tooth gear fixed to a counter wheel, and each unit of the register actuator movement would drive the twelve tooth gear one-twelfth of a revolution. The fractions on the tapes 27, in this latter case, would be disposed with the "¼" alongside the "3," with the "½" alongside the "6," and with the "¾" alongside the "9."

The embodiment of the invention as shown in FIGS. 10-15 is similar in many respects to the embodiment shown in FIGS. 1-9. Many of the parts of the embodiment of FIGS. 1-9 are identical to corresponding parts in the embodiment of FIGS. 10-15 and these corresponding identical parts bear identical reference numerals.

The embodiment of FIGS. 10-15 differs from the embodiment of FIGS. 1-9 only in the structure and operation of the device for entering fractions.

Figure 10:
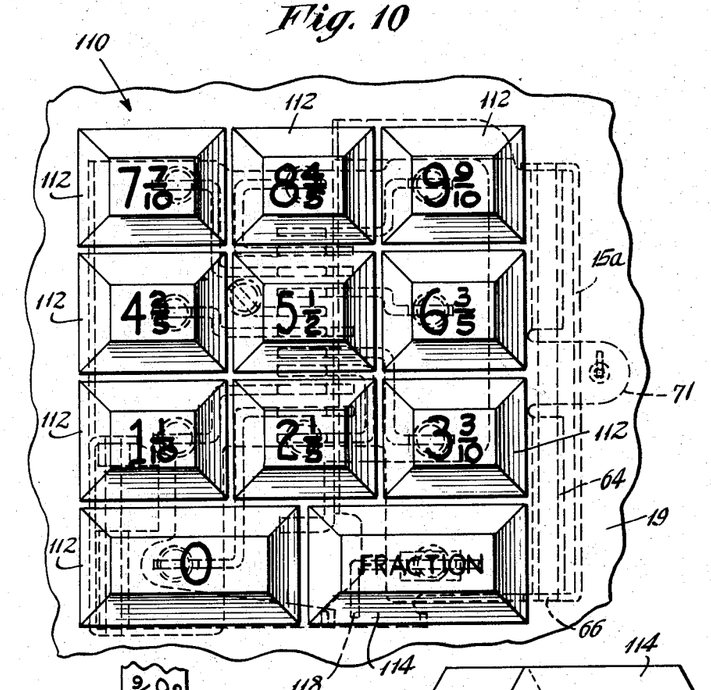
FIG. 10 is a plan view of the keyboard arrangement according to a second embodiment of the invention.

Referring to FIG. 10, the mechanism of the second embodiment includes a keyboard unit 110 having ten keys 112, each of which is identical in structure to its counterpart in the first embodiment except that it is labelled with a fraction as well as a whole number. Rather than a separate key being provided for each fraction capable of being entered, the keyboard unit 110 includes a conditioning or setup member in the form of a key 114 labelled "FRACTION." In operation, each of the keys 112 is operated in succession to enter successive whole numbers in the same manner as that of the keys 12 of FIGS. 1-9. To enter a fraction, however, the conditioning member 114 is first depressed and then the desired one of the keys 112 is depressed to enter the fraction labelled thereon.

Figure 11:
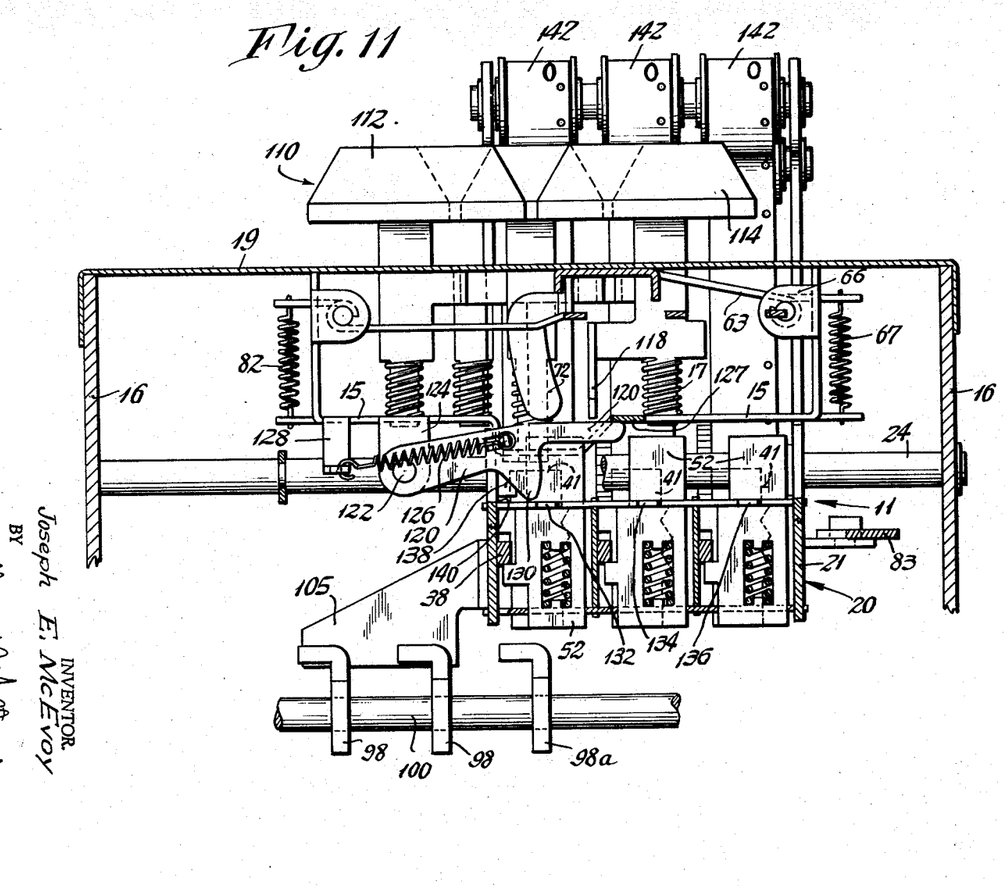
FIG. 11 is an elevational view taken in section along the line 11—11 in FIG. 12.
Figure 12:
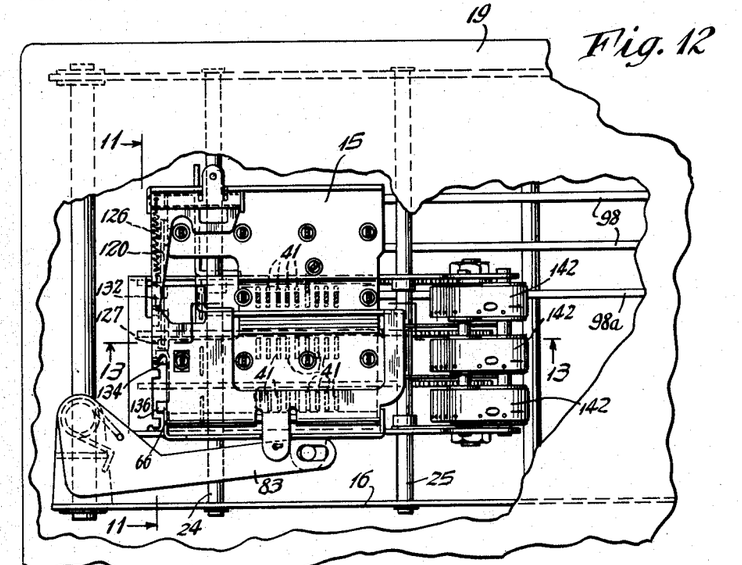
FIG. 12 is a plan view taken directly under the cover plate of the device of FIG. 11 and showing portions of the key stems in section.
Figure 13:
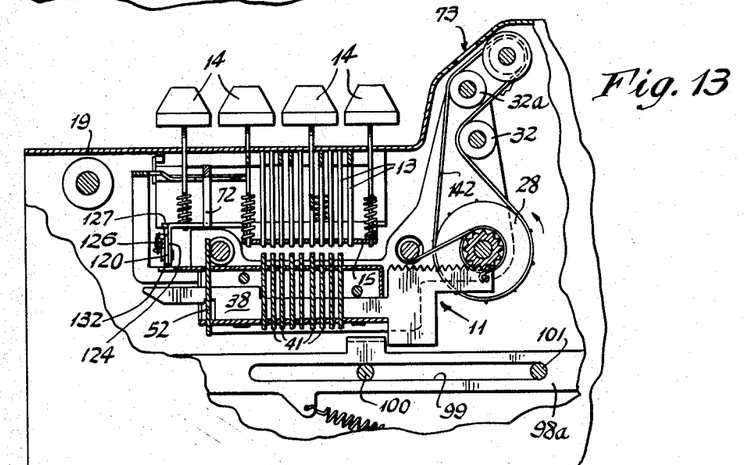
FIG. 13 is an elevational view taken in section along the line 13—13 in FIG. 12.
Figure 14:
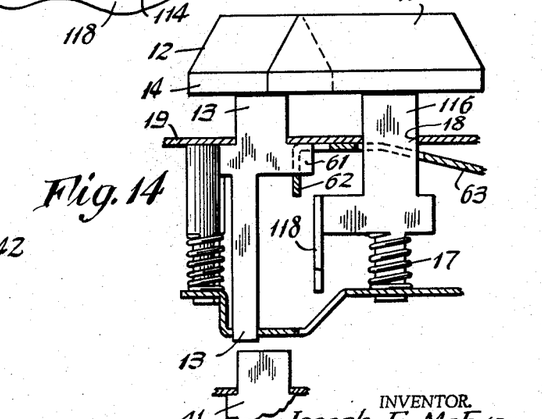
FIG. 14 is an elevational view partly in section and showing the "FRACTION" conditioning key according to said second embodiment.

In the manner now to be described, operation of the conditioning key 114 acts to prevent indexing with the result that subsequent operation of any one of the keys 112 effects entry of any one of the fraction labelled on that key. The conditioning key 114, as best shown in FIGS. 11 and 14, has a stem 116 slidable in the slots 18 in the support 15. Unlike the stem 94 of key 12a in FIG. 6, the stem 116 does not include a portion overlying any of the rack stop bars 41 and does not carry a stem extension 95. Rather, the stem 116 has integral therewith a laterally and then downwardly extending stem extension 118 which terminates adjacent and above the distal end of an over-center or toggle stop member 120. Stop member 120 is pivoted at 122 to a lug 124 integral with the stationary frame member 15. A tension spring 126 is connected at one end to stop member 120 and at its other end to another lug 128 integral with stationary frame member 15 such that the stop member remains in either one of two over-center positions it is placed until moved to the other. The first or retracted one of these two over-center positions is shown in FIG. 11 at which the distal end of stop member 120 engages a horizontally extending lug 127 integral with the stationary frame member 15 and a nose 130 of this stop member lies clear of the path of indexing movement of three mututally spaced lugs 132, 134 and 136 carried by the indexable carriage support 20. In the second or depressed position of the stop member 120, the nose 130 thereof lies in the path of indexing movement of the lugs 132, 134 and 136, with the distal end of the stop member engaging a respective one of these lugs depending upon the position of the carriage unit 11. With the stop member 120 in its depressed over-center position, indexing of the carriage unit 11 is prevented by the blocking action of the nose 130 relative to the particular one of the lugs 132, 134, 136, it is then next adjacent. A cam surface 138 is provided by the nose 130 for returning the stop member to its retracted position each time the carriage unit 11 is moved to its returned position at the end of each cycle of operation. In this connection, movement of the carriage support 20 along with the rest of carriage unit 11 from left to right (as viewed in FIG. 11) to the returned position after a value has been entered, results in many cases in movement of one of the lugs 132 or 134 against the cam surface 138 to cam the stop member to the retracted position. The only exception to this occurs when the stop member has been moved to its depressed position with the carriage in its returned position. In this case, the conventional overtravel of the carriage unit 11 (to the right as viewed in FIG. 11) as occurs at the end of each cycle of operation, results in movement of the corner 140 provided by the carriage support 20 against the cam surface 138 thereby camming the stop member back to its retracted position.

Figure 15:
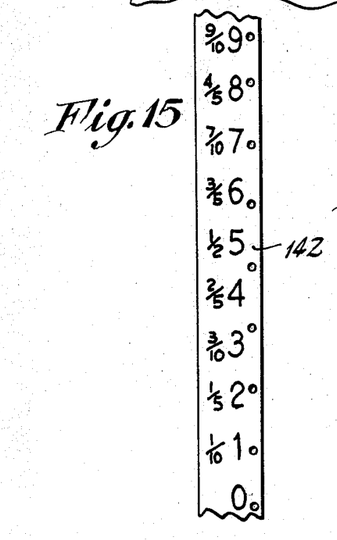
FIG. 15 is a detail view of a portion of an indicator tape according to said second embodiment.

The value bearing tape loop 142 of the second embodiment as shown in FIG. 15 is identical with the tape loop 27 of FIG. 9 (and could be substituted therefor in the first embodiment) except for the provision of a fraction alongside each of the whole numbers "0" through "9" rather than a fraction alongside only the whole number "5."

Since the embodiment of FIGS. 10–15 provides for the entry of the fractions "1/10" through "9/10," inclusive (which correspond, of course, to the values "0.1" through "0.9" inclusive) rather than only the fraction "½" (or "0.5"), all three sets of rack stop bars 41 include a full nine bars 41 rather than only two of these sets.

Whereas the latch bar 52 farthest to the right as viewed in FIG. 2 of the first embodiment is notched out at its upper end as shown at 97, the corresponding latch bar 52 of the embodiment of FIGS. 10–15 is not notched out but rather is identical to the other two latch bars (see FIG. 11).

It will be clear that the second embodiment differs from the first embodiment only as particularly described herein.

In operation of the second embodiment, assume again that the value "15½" is to be entered. As with the first embodiment the carriage unit 11, in its initial returned position, is disposed with one of its control units (the leftmost row of pins 41 as viewed in FIG. 11) aligned and associated with the register actuator 98a which provides for entry of a fraction. The key 112 labelled "1/10" is operated with the result that the carriage unit indexes one space and the number 1 appears in the window 73a which represents the lowest denominational order. The key 112 labelled "5½" is then operated with the result that the carriage unit 11 again indexes one space and the number 1 indexes from the window 73a of the lowest denominational order and appears in the window 73a of the next higher denominational order. Also, the number "5" appears in the window 73a of the lowest denominational order. To enter the fraction "½," the conditioning key 114 labelled "FRACTION" is operated and then the key 112 labelled "5½" is operated. When the conditioning key 114 is depressed, the key stem extension 118 is depressed against the distal end of stop member 120, causing the latter to move to the depressed over-center position at which the nose 130 thereof lies in blocking engagement with the lug 136. This prevents subsequent indexing of the carriage unit 11 so that depression and release of the key 112 labelled "5½" results in no indexing of the carriage unit 11 (even though the tripping member 63 is depressed) and the fraction "½" appears in the window 73b. The two whole numbers "1" and "5" remain in the respective windows 73a, of course, and the value "15½" appears to the observer just as was the case with the first embodiment when this value was entered thereinto. As is obvious, the register actuators 98, 98 and 98a operate to register the value "15½" in the same manner as that described above in connection with the embodiment of FIGS. 1–9.

An advantage of the second embodiment as well as the first embodiment is that, unlike conventional value entering mechanisms whose carriage unit indexes every time a number key is operated, if the value to be entered contains or includes no fraction (or its decimal equivalent) there is no necessity of operating a "zero" key to enter a zero for the fraction (or its decimal equivalent). By way of example, to enter the value "15.0" in a conventional ten key type value entering mechanism, three keys must be operated in succession, namely: the "1" key, the "5" key and then the "zero" key. With both of the above-described embodiments, only the "1" and "5" keys need be operated.

The provision of a ten key keyboard type of machine including a plurality of register actuators each of which is movable settable distances as determined by the previous movement of an indicator member (rack 37), which previous movement is in turn determined by a settable control member (stop bar 41), is generally old and conventional in the art. Also, it is obvious and conventional that if the machine does not include a value indicating means (and even if it does), the settable control members can be arranged to determine the amount of movement of the register actuators directly rather than indirectly through the indicator members. An important distinction presented by the herein disclosed embodiments of the present invention for value registration, however, lies in the fact that with the carriage unit 11 in its initial, returned position, the first one of the indicator members 37 (or the first one of the control members) is aligned and thereby associated with the first register actuator 98a to provide for entry of the fraction. In conventional ten key keyboard type machines, the carriage unit indexes every time a key is operated, and the first indicator member (or first control member) does not become associated with the first register actuator until after the carriage unit indexes one space.

The present invention is not limited to the entry of values which include fractions. For example, an additional denominational order could be substituted for the fraction in the embodiment of FIGS. 1–9. With such an arrangement one or more keys such as the key 12a would be provided for the lowest denominational order and, as brought out in the description of the embodiment of FIGS. 1–9, operation of any such key would not effect indexing of the carriage unit 11 whereas operation of any of the keys 12 does effect indexing. Obviously, the respective decimal equivalents could be substituted for the fractions of the embodiment of FIGS. 10–15. An advantage of such an arrangement is that one index space is saved thereby permitting the provision of an additional denominational order in the same space required for a conventional device or, alternatively, requiring less space than a conventional device having the same number of denominational orders.

With both of the embodiments of the invention disclosed herein, it is important, once the keyboard has been operated during any operating cycle to enter or to initiate entry of a fraction, that no number keys of the keyboard incapable of being used to enter a fraction be operated. This is the case because once a fraction has been entered or entry of a fraction has been initiated, it is obvious that no whole number can properly be entered.

Figure 16:
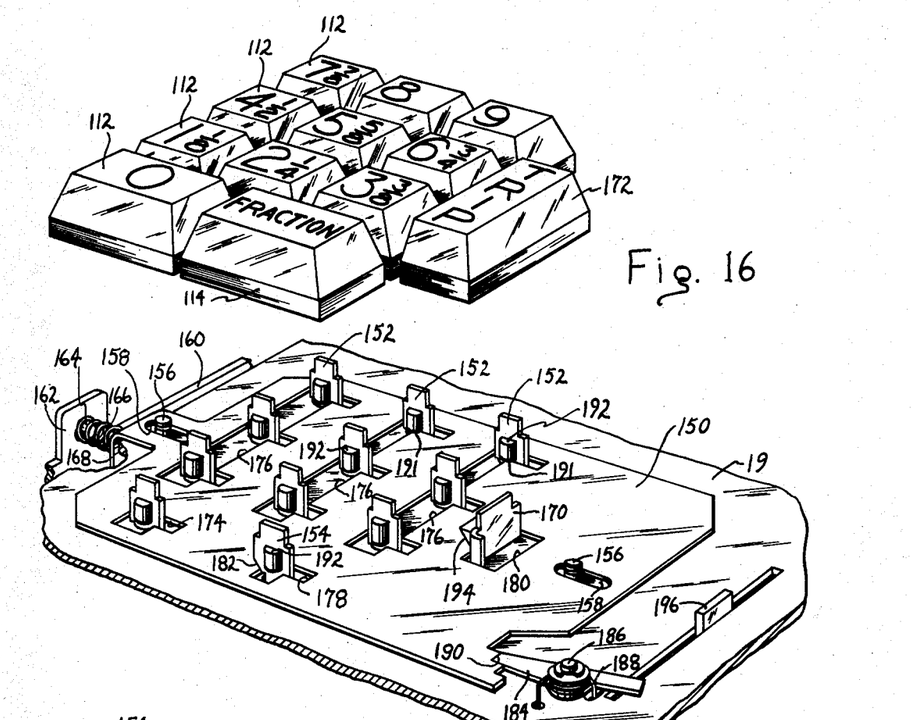
FIG. 16 is a fragmentary perspective view, exploded in part, of a keyboard and underlying structure for effecting lock-out of predetermined keys.

FIGS. 16, 17a, 17b, 17c and 17d depict an improvement to achieve, among others, the result of preventing such whole number keys from being operated; this improvement being applied to the embodiment of FIGS. 10–15 and to the seven fractions from "⅛" by eighths through "⅞," inclusive, although it will be clear that this improvement can be applied to the first embodiment and to other fractions as well. As shown in FIG. 16, a lock-out plate 150 is provided which is mounted on cover plate 19 for slidable movement along a path extending perpendicular to the direction in which the key stems 152 and 154 extend. The plate 150 is guided for this slidable movement by pins 156 fixed on the cover plate 19; each of these pins projecting through one of the elongated slots 158 provided by the lock-out plate.

A bracket 160 fixed to the cover plate 19 provides a lug 162 having a lateral boss 164 supporting one end of a compression spring 166. The other end of the spring 166 is similarly supported by a downwardly extending lug 168 integral with the plate 150. In this fashion, the spring 166 yieldably urges the lock-out plate 150 toward the right as viewed in FIG. 16.

Figure 17A:
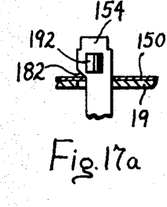
FIGS. 17a, 17b, 17c and 17d are fragmentary elevational views of the cover plate, lock-out plate and the stem of the fraction-conditioning key of FIG. 16, these views showing successive positions of the lock-out plate.
Figures 17B, 17C, 17D:
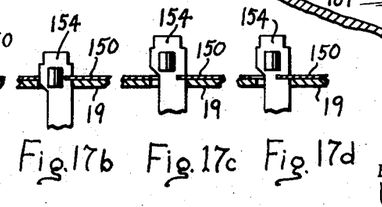

Each of the key stems 152 and 154, as well as the stem 170 of a trip bar 172 later to be described, extends through one of the openings 174, 176, 178 or 180, respectively, as provided by the lock-out plate. The key stem 154 for the fraction conditioning key 114 is provided with a cam surface 182 which cooperates with the adjacent cam-following edge of the plate 150 to provide a motion-translating means whereby depression of the conditioning key 114 from the position of FIG. 17a to the position of FIG. 17b results in lateral sliding movement of the plate 150 from the position of FIG. 17a to that of FIG. 17b. When the key stem 154 is released and returns to its normal position as shown in FIG. 17c, the lockout plate 150 remains in the position to which it was moved by the action of latch means now to be described. A latch lever 184 (FIG. 16) is mounted for pivotal movement about a pin 186 fixed to the cover plate 19. A torsion spring 188, in conventional fashion, yieldably urges the latch lever 184 in the counterclockwise direction as viewed in FIG. 16. The proximal end of the lever 184 is engageable with the adjacent stepped edge 190 of the lock-out plate 150. It will be apparent, therefore, that when the plate 150 moves from the position of FIG. 17a to the position shown in FIG. 17b, the proximal end of the latch lever 184 moves from the uppermost to the next lower step of the stepped edge 190 of the plate 150 and retains the latter in the position of FIGS. 16 and 17c.

Each of the stems 152, 154 and 170 is capable of being depressed, when the lock-out plate 150 is in its far rightward position (FIG. 17a), without hindrance by the lock-out plate. When the lock-out plate 150 is in the position of FIGS. 16 and 17c, however, a portion 191 of the lock-out plate moves into interfering relation with an abutment 192 of selected ones of the key stems 152, 154. Since the lock-out plate 150 in FIG. 16 accommodates a keyboard having fractions capable of being entered by depression of each of the whole number keys 1 through 7 (to accommodate the fractions "⅛" through "⅞"), the whole number keys 8 and 9 are locked-out by the plate 150 against depression when this plate is in the position of FIGS. 16 and 17c. In this connection, it can be seen in FIG. 16 that the abutment 192 carried by the key stems 152 of the "8" and "9" keys, overlies a portion 191 of the plate 150 whereby depression of these keys is prevented. It follows that once the fraction conditioning key 114 is depressed, the lock-out plate locks out the 8 and 9 keys.

It is noted that depression of the zero key 112 after the conditioning key 114 has been depressed will not cause the entry of any fraction, and for this reason the lock-out plate 150 is not provided with a portion underlying the abutment 192 of the key stem 152 of the zero key so as to lock out this latter key. Depression of the zero key (after depression of the conditioning key 114) dies, however, depress the first stop bar 41 of the row of stop bars then in position to be depressed, and when this occurs, none of the keys "1" through "9" is effective to enter its designated value. As a result, it may be desirable to lock out the zero key as well as the "8" and "9" keys (when the conditioning key 114 is depressed) in which case the plate 150 would be provided with a portion to underlie the abutment 192 of the stem 152 of zero key when the lock-out plate is in the position of FIGS. 16 and 17c.

The stem 170 of the trip key 172 is provided with a cam surface 194 which cooperates with the adjacent cam-following edge of the lock-out plate 150 in a manner similar to that for the key stem 154, as previously described, to provide a motion-translating means effective to index the plate 150 to its extreme leftward position (as viewed in FIG. 16). It will be noted that the plate 150 will be indexed to this extreme leftward position from either the extreme rightward position or the intermediate position, whichever the case may be just before depression of the trip key 172 is accomplished. With the lock-out plate 150 retained in its extreme leftward position, as effected by the proximal end of the latch lever 184 engaging the lowermost step of the stepped portion of the plate, all of the keys of the keyboard (excepting, of course, the trip key 172) are prevented from depression by interference of a portion of the plate underlying the abutment of each one of the key stems 152 and 154. This can best be seen in FIG. 17d wherein the lock-out plate 150 is shown in its extreme leftward position whereat the abutment 192 of key stem 154 overlies a portion of the plate 150 thereby preventing depression of the conditioning key 114 in the same manner as that for all of the keys 112. This is advantageous in that once the trip key 172 is depressed, all of the remaining keys of the keyboard are prevented from being depressed. This avoids damage to the operating mechanism as could occur if one of the keys 112, 114 were to be depressed during an operating cycle after depression of the trip key 172.

For releasing the lock-out plate for movement under the force of the spring 166 back to its initial extreme rightward position, the distal end of the latch lever 184 is disposed in the path of movement of the conventional "CLEAR" bar 196. As is conventional, the "CLEAR" bar 196 is moved (in this case downwardly and to the left as viewed in FIG. 16) at the end of each operating cycle (except when the "REPEAT" key has been depressed) as well as each time the "CLEAR" key is manually operated. This movement brings the bar 196 against the distal end of the latch lever 184 causing the latter to swing in the clockwise direction to release the plate 150 to its extreme rightward position.

It will be apparent that the embodiment of FIGS. 1–9, when provided with the arrangement shown in FIG. 16, would operate in similar fashion. That is, depression of the fraction key 12a would be effective to index the lock-out plate to the intermediate position at which certain of the remaining keys of the keyboard would be locked out. In this case (providing for the entry of the seven fractions from "⅛" through "⅞"), all of the whole number keys "0" through "9" would be locked out once the fraction key (or any additional fraction keys, if provided) was depressed.

It will be clear that with the arrangement of the keyboard as shown in FIG. 16, depression of the "1⅛" key after depression of the conditioning key 114 would be effective to depress the second stop bar of each group of aligned stop bars and depression of the "2¼" key after depression of the key 114 would be effective to depress the third stop bar of each group of aligned stop bars, etc. The register actuator 98a, when released, would move one unit of distance if the second stop bar was depressed, two units if the third stop bar was depressed, etc. The register actuator could drive an eight-tooth gear fixed to a counter wheel, and each unit of the actuator movement would drive the eight-tooth gear one-eighth of a revolution. The fractions on the tapes 142, in this case, would be disposed alongside the same respective whole numbers as those alongside which they are disposed on the keys 112.

The essential value indicating means and value registering means embodying the present invention have been shown in the drawing and described in detail above. The structure and description thereof for releasing the register actuators 98, 98a, for returning the stop bars 41, racks 37, register actuators 98, 98a, for accumulating the values entered into the registering means by the register actuators, etc., being conventional in the art and forming no part of the present invention, have been omitted from this description.

As is obvious to those skilled in the art, rather than having the values set and entered into the machine appearing to an observer directly by the value indicating means, the latter as well as the value registering means could be adapted to print out each of the values. Also, it will be clear that any practical number of denominational orders can be provided in addition to the two incorporated in the devices as particularly disclosed herein.

Since many changes can be made in the embodiments of the invention as particularly described and shown herein without departing from the scope of the invention, it is intended that these embodiments be considered as exemplary and that the invention not be limited except as warranted by the following claims.

What is claimed is:

1. A value indicating mechanism for indicating values involving a whole number disposed in each one of a plurality of successive denominational orders and at least one additional number which is less than the difference between two successive whole numbers in the lowest one of said denominational orders; said mechanism comprising:

control means including a plurality of control units;

an indicator member constantly associated with each of said control units;

indexing means for indexing said control means a successive step from a returned position each time the indexing means is tripped, thereby to index one of said control units to a first location for said additional number, to index any one of said control units at said first location to a location for said lowest denominational order, and to index any one of said control units at a location for one of said denominational orders to a location for the next higher denominational order;

said control means, when in said returned position, being disposed with one of said control units at said first location;

a first value setting means operatively arranged, when actuated, for setting the control unit then at said first location, thereby to control setting of the indicator member associated therewith to a set position for one of said whole numbers and for tripping said indexing means;

a second value setting means operatively arranged, when actuated, for setting the control unit then at said first location, thereby to control setting of the indicator member associated therewith to a set position for said additional member, and for by-passing said indexing means;

and means cooperable with the indicator members and located to designate the whole number set in any of said denominational orders and to designate said additional number when set.

2. A value indicating mechanism for indicating values involving a whole number disposed in each one of a plurality of successive denominational orders and at least one fraction which is less than the difference between two successive whole numbers in the lowest one of said denominational orders; said mechanism comprising:

control means including a plurality of control units;

a respective indicator member constantly associated with each of said control units;

indexing means for indexing said control means a successive step from a returned position each time the indexing means is tripped, thereby to index one of said control units to a fraction location, to index any one of said control units at said fraction location to a location of the lowest denominational order, and to index any one of said control units at a location of one of said denominational orders to a location of the next higher denominational order;

said control means, when in said returned position, being disposed with one of said control units at said fraction location;

a first value setting means operatively arranged, when actuated, for setting the control unit then at said fraction location, thereby to control setting of the indicator member associated therewith to a set position for one of said whole numbers, and for tripping said indexing means;

a second value setting means operatively arranged, when actuated, for setting the control unit then at said fraction location thereby to control setting of the indicator member associated therewith to a set position for said fraction, and for by-passing said indexing means;

and means cooperable with the indicator members and located to designate the whole number set in any of said denominational orders and to designate said fraction when set.

3. A value indicating mechanism for indicating values involving a whole number disposed in each one of a plurality of successive denominational orders and at least one fraction which is less than the difference between two successive whole numbers in the lowest one of said denominational orders; said mechanism comprising:

a plurality of indicator members;

each of said indicator members bearing a row of whole numbers and bearing at least one fraction at a location transversely of the respective row of whole numbers;

means providing a window and an opaque portion for the fraction and for each of said denominational orders;

indexing means for indexing said indicator members a successive step from a returned position each time the indexing means is tripped, thereby to index one of said indicator members to a first location behind the window and opaque portion for the fraction, to index any indicator member at said first location to a second location behind the window and opaque portion for the lowest denominational order, and to index any indicator member at a location behind the window and opaque portion for any one of the denominational orders to a location behind the window and opaque portion for the next higher denominational order;

the window for each of the denominational orders and the opaque portion for the fractional value being aligned with the row of whole numbers of any indicator member therebehind;

the opaque portion for each of the denominational orders and the window for the fraction being aligned with the fraction of any indicator member therebehind;

said indicator members, when in the returned position, being disposed with one of said indicator members at said first location; and a keyboard including a group of keys for setting values in said denominational orders and including one or more additional keys for setting the fraction;

each key of said group being operatively arranged, when actuated, for effecting movement of the indicator member then at said first location to set position in the direction of the row of whole numbers thereon, and for tripping said indexing means;

and each additional key being operatively arranged, when actuated, for effecting movement of the indicator member then at said first location to set position in said last-named direction, and for by-passing said indexing means.

4. A value indicating mechanism for indicating values involving a whole number disposed in each one of a plurality of successive denominational orders and at least one fraction which is less than the difference between two successive whole numbers in the lowest one of said denominational orders;
    said mechanism comprising:
    a plurality of indicator members;
    each of said indicator members bearing a plurality of whole numbers and bearing at least one fraction at a location transversely of the whole numbers thereon;
    means providing a respective window for the fraction and for each of said denominational orders;
    indexing means for indexing said indicator members a successive step from a returned position each time the indexing means is tripped, thereby to index one of said indicator members to a first location behind the window for the fraction, to index any indicator member at said first location to a location behind the window for the lowest denominational order, and to index any indicator element at a location behind the window for any one of said denominational orders to a location behind the window for the next higher denominational order;
    a first means operatively arranged to set the indicator member then at said first location to any one of said whole numbers thereon and to trip said indexing means;
    a second means operatively arranged to set the indicator member then at said first location to the fraction thereon and to by-pass said indexing means;
    the respective window for each of said denominational orders being positioned to expose only the set whole number of any indicator member therebehind;
    and the window for the fraction being offset to expose the set fraction of any indicator member therebehind.

5. In a registering mechanism for registering values involving a whole number disposed in each one of a plurality of successive denominational orders and at least one additional number which is less than the difference between two successive whole numbers in the lowest one of said denominational orders;
    said mechanism comprising:
    a respective register member for each of said denominational orders;
    an additional register member for said additional number;
    each of said respective register members being settable to effect registration of a value in the respective one of said denominational orders;
    said additional register member being settable to effect registration of said additional number;
    control means including a plurality of control units;
    each of said control units, when set and associated with one of said register members, being arranged to control the setting of that register member;
    indexing means for indexing said control means a successive step from a returned position each time the indexing means is tripped, thereby to index one of said control units into association with said additional register member, to index any control unit associated with said additional register member into association with the respective register member for the lowest one of said denominational orders, and to index any control unit associated with one of said respective register members into association with the respective register member for the next higher denominational order;
    said control means, when in the returned position, being disposed with one of said control units associated with said additional register member;
    a first setting means operatively arranged for actuation thereof to set the control unit then associated with said additional register member and to trip said indexing means;
    and a second setting means operatively arranged for actuation thereof to set the control unit then associated with said additional register member and to by-pass said indexing means.

6. In a registering mechanism for registering values involving a whole number disposed in each one of a plurality of successive denominational orders and at least one additional number which is less than the difference between two successive whole numbers in the lowest one of said denominational orders;
    a respective register member for each of said denominational orders;
    an additional register member for said additional number;
    each of said respective register members being settable to effect registration of a value in the respective one of said denominational orders;
    said additional register member being settable to effect registration of said additional number;
    control means including a plurality of control units;
    each of said control units, when set and associated with one of said register members, being arranged to control the setting of that register member;
    indexing means for indexing said control means a successive step from a returned position each time the indexing means is tripped, thereby to index one of said control units into association with said additional register member, to index any control unit associated with said additional register member into association with the respective register member for the lowest one of said denominational orders, and to index any control unit associated with one of said respective register members into association with the respective resigster member for the next higher denominational order;
    said control means, when in the returned position, being disposed with one of said control units associated with said additional register member;
    a first setting means operatively arranged for actuation thereof to set the control unit then associated with said additional register member and to trip said indexing means;
    and a second setting means operatively arranged for actuation thereof to set the control unit then associated with said additional register member and to by-pass said indexing means.

7. In a registering mechanism for registering values involving a whole number disposed in each one of a plurality of successive denominational orders and at least one fraction which is less than the difference between two successive whole numbers in the lowest one of said denominational orders;
    a first register member for the fraction;
    an additional register member for each of said denominational orders;
    said first register member being settable for effecting registration of said fraction;
    each of said additional register members being settable to effect registration of a whole number in the respective one of said denominational orders;
    control means including a plurality of control units;
    each of said control units, when set and associated with one of said register members, being arranged to control the setting of that register member;
    indexing means for indexing said control means a successive step from a returned position each time the indexing means is tripped, thereby to index one of said control units into association with said first register member, to index any control unit associated with said first register member into association with the additional one of said register members for the lowest denominational order, and to index any control unit associated with one of the additional register members into association with the additional register member for the next higher denominational order;

said control means, when in the returned position, being disposed with one of said control units associated with said first register member;

whole number setting means operatively arranged for actuation thereof to set the control unit then associated with the first register member and to trip said indexing means;

and fraction setting means operatively arranged for actuation thereof to set the control unit then associated with the first register member and to by-pass said indexing means.

8. In a registering mechanism for registering values involving a whole number disposed in each one of a plurality of successive denominational orders and at least one fraction which is less than the difference between two successive whole numbers in the lowest one of said denominational orders:

a first register member for the fraction;

an additional register member for each of said denominational orders;

said first register member being movable a settable amount for effecting registration of said fraction;

each of said additional register members being movable a settable amount to effect registration of a whole number in the respective one of said denominational orders;

a carriage;

control means carried by said carriage;

said control means including a plurality of control units;

each of said control units, when set and associated with one of said register members, being arranged to control said settable amount of movement of that register member;

indexing means for indexing said carriage a successive step from a returned position each time the indexing means is tripped, thereby to index one of said control units into association with said first register member, to index any control unit associated with said first member into association with the additional one of said register members for the lowest denominational order, and to index any control unit associated with one of the additional register members into association with the additional register member for the next higher denominational order;

said carriage, when in returned position, being disposed with one of said control units associated with said first register member;

whole number setting means operatively arranged for actuation thereof to set the control unit then associated with the first register member and to trip said indexing means;

and fraction setting means operatively arranged for actuation thereof to set the control unit then associated with the first register member and to by-pass said indexing means.

9. In a registering mechanism for registering values involving a whole number disposed in each one of a plurality of successive denominational orders and at least one fraction which is less than the difference between two successive whole numbers in the lowest one of said denominational orders:

a first register unit for the fraction;

an additional register unit for each of said denominational orders;

said first register unit being settable for effecting registration of said fraction;

each of said additional register units being settable to effect registration of a whole number in the respective one of said denominational orders;

a carriage;

control means carried by said carriage;

said control means including a plurality of control units;

each of said control units, when set and associated with one of said register units, being arranged to control the setting of that register unit;

indexing means for indexing said carriage a successive step from a returned position each time the indexing means is tripped, thereby to index one of said control units into association with said first register unit, to index any control unit associated with said first register unit into association with the additional one of said register units for the lowest denominational order, and to index any control unit associated with one of the additional register units into association with the additional register unit for the next higher denominational order;

said carriage, when in returned position, being disposed with one of said control units associated with said first register unit;

whole number setting means operatively arranged for actuation thereof to set the control unit then associated with the first register unit and to trip said indexing means;

and fraction setting means operatively arranged for actuation thereof to set the control unit then associated with the first register unit and to by-pass said indexing means.

10. In a registering mechanism for registering values involving a whole number disposed in each one of a plurality of successive denominational orders and at least one fraction which is less than the difference between two successive whole numbers in the lowest one of said denominational orders:

a first register member for the fraction;

an additional register number for each of said denominational orders;

said first register member being settable for affecting registration of said fraction;

each of said additional register members being settable to effect registration of a whole number in the respective one of said denominational orders;

control means including a plurality of control units; each of said control units, when set and associated with one of said register members, being arranged to control the setting of that register member;

indexing means for indexing said control means a successive step from a returned position each time the indexing means is tripped, thereby to index one of said control units into association with said first register member, to index any control unit associated with said first register member into association with the additional one of said register members for the lowest denominational order, and to index any control unit associated with one of the additional register members into association with the additional register member for the next higher denominational order;

said control means, when in the returned position, being disposed with one of said control units associated with said first register member;

and a keyboard including a group of whole number keys each of which is arranged, when operated, to set the control unit then associated with the first register member and to trip said indexing means;

said keyboard further including one or more fraction keys each of which is arranged, when operated, to set the control unit then associated with the first register member and to by-pass said indexing means.

11. In a value indicating and value registering mechanism for indicating and registering values involving a whole number disposed in each one of a plurality of successive denominational orders and at least one fraction which is less than the difference between two successive whole numbers in the lowest one of said denominational orders:

- control means including a plurality of control units;
- a respective indicator member constantly associated with each of said control units;
- a first register member for said fraction;
- a respective register member for each of said denominational orders;
- indexing means for said control means a successive step from a returned position each time the indexing means is tripped, thereby to index one of said control units into association with said first register member, to index any control unit associated with said first register member into association with the respective one of said register members for the lowest denominational order, and to index any control unit associated with one of said respective register members into association with the respective register member for the next higher denominational order;
- said control means, when in the returned position, being disposed with one of said control units in association with said first register member;
- a first value setting means operatively arranged, when actuated, for setting the control unit then associated with said first register member, thereby to control setting of the indicator member and register member associated therewith to a set postion for one of said whole numbers, and for tripping said indexing means;
- a second value setting means operatively arranged, when actuated, for setting the control unit then associated with said first register member, thereby to control setting of the indicator member and register member associated therewith to a set position for said fraction, and for by-passing said tripping means;
- and means cooperable with the indicator members and located to designate the whole number set in any of said denominational orders and to designate said fraction when set.

12. A settable value indicating mechanism for indicating values involving a whole number disposed in each one of a plurality of successive denominational orders and at least one fraction which is less than the difference between two successive whole numbers in the lowest one of said denominational orders, said mechanism comprising:

- a plurality of whole number setting keys;
- a fraction setting key;
- a plurality of indicator elements;
- a transversely movable carriage supporting said indicator elements;
- means operatively interconnecting said whole number setting keys with said indicator elements to move one of the latter to a set whole number position each time one of said whole number setting keys it set;
- indexing means operatively arranged to transversely index said carriage each time one of said whole number keys is set, for indexing said one indicator element to a whole number indicating location in the lowest one of said denominational orders and for indexing each previously set one of said indicator elements to a respective whole number indicating location in the next higher one of said denominational orders;
- an indicator element at a fraction indicating location;
- and means operatively arranged to by-pass said indexing means and to move said last-named indicator element to a set fraction position at said fraction indicating location each time said fractional value key is set;
- and means cooperable with the indicator members and disposed at the above-mentioned locations to designate the whole number set in any of said denominational orders and to designate said fraction when set.

13. A value indicating mechanism for indicating values involving a whole number disposed in each one of a plurality of successive denominational orders and at least one additional number which is less than the difference between two successive whole numbers in the lowest one of said denominational orders; said mechanism comprising:

- control means including a plurality of control units;
- an indicator member constantly associated with each of said control units;
- indexing means for indexing said control means a successive step from a returned position each time the indexing means is actuated, thereby to index one of said control units to a first location for said additional number, to index any one of said control units at said first location to a location for said lowest denominational order, and to index any one of said control units at a location for one of said denominational orders to a location for the next higher denominational order;
- said control means, when in said returned position, being disposed with one of said control units at said first location;
- value setting means operatively arranged, when actuated, for setting the control unit at said first location, thereby to control setting of the indicator member associated therewith to a set value indicating position;
- means operatively arranged for actuating said indexing means to index said control means one of said successive steps only when said value setting means is actuated to set one of said whole numbers; and
- means cooperable with the indicator members and located to designate the whole number set in any of said denominational orders and to designate said additional number when set.

14. A value indicating mechanism for indicating values involving a whole number disposed in each one of a plurality of successive denominational orders and at least one additional number which is less than the difference between two successive whole numbers in the lowest one of said denominational orders; said mechanism comprising:

- control means including a plurality of control units;
- an indicator member constantly associated with each of said control units;
- indexing means for indexing said control means a successive step from a returned position each time the indexing means is actuated, thereby to index one of said control units to a first location for said additional number, to index any one of said control units at said first location to a location for said lowest denominational order, and to index any one of said control units at a location for one of said denominational orders to a location for the next highr denominational order;
- said control means, when in said returned position, being disposed with one of said control units at said first location;
- value setting means operatively arranged, when actuated, for setting the control unit at said first location, thereby to control setting of the indicator member associaed therewith to a set value indicating position;
- means operatively arranged for actuating said indexing means to index said control means one of said successive steps each time said value setting means is actuated, thereby normally to effect setting of one of said whole numbers;
- conditioning means operatively arranged, when actuated, for preventing actuation of said indexing means whereby subsequent actuation of said value setting means results in setting of the indicator member associated with the control unit then at said first location without indexing of said control means, thereby to effect setting of one of said additional numbers; and means cooperable with the indicator members and located to designate the whole number set in any of said denominational orders and to designate the respective additional number when set.

15. In a registering mechanism for registering values involving a whole number disposed in each one of a plurality of successive denominational orders and at least one additional number which is less than the difference between two successive whole numbers in the lowest one of said denominational orders; said mechanism comprising:

a respective register member for each of said denominational orders;

an additional register member for said additional number;

each of said respective register members being settable to effect registration of a value in the respective one of said denominational orders;

said additional register member being settable to effect registration of said additional number;

control means including a plurality of control units;

each of said control units, when set and associated with one of said register members, being arranged to control the setting of that register member;

indexing means for indexing said control means a successive step from a returned position each time the indexing means is actuated, thereby to index one of said control units into association with said additional register member, to index any control unit associated with said additional register member into association with the respective register member for the lowest one of said denominational orders, and to index any control unit associated with one of said respective register members into association with the respective register member for the next higher denominational order;

said control means, when in the returned position, being disposed with one of said control units associated with said additional register member;

value setting means operatively arranged for actuation thereof to set the control unit then associated with said additional register member; and means operatively arranged for actuating said indexing means to index said control means one of said successive steps only when said value setting means is actuated to set one of said whole numbers.

16. In a registering mechanism for registering values involving a whole number disposed in each one of a plurality of successive denominational orders and at least one additional number which is less than the difference between two successive whole numbers in the lowest one of said denominational orders; said mechanism comprising:

a respective register member for each of said denominational orders;

an additional register member for said additional number;

each of said respective register members being settable to effect registration of a value in the respective one of said denominational orders;

said additional register member being settable to effect registration of said additional number;

control means including a plurality of control units;

each of said control units, when set and associated with one of said register members, being arranged to control the setting of that register member;

indexing means for indexing said control means a successive step from a returned position each time the indexing means is actuated, thereby to index one of said control units into association with said additional register member, to index any control unit associated with said additional register member into association with the respective register member for the lowest one of said denominational orders, and to index any control unit associated with one of said respective register members into association with the respective register member for the next higher denominational order;

said control means, when in the returned position, being disposed with one of said control units associated with said additional register member;

value setting means operatively arranged for actuation thereof to set the control unit then associated with said additional register member;

means operatively arranged for actuating said indexing means to index said control means one of said successive steps each time said value setting means is actuated;

and conditioning means operatively arranged, when actuated, for preventing actuation of said indexing means whereby subsequent actuation of said value setting means results in setting of the control unit then associated with said additional register member without indexing of said control means.

17. In a value indicating and value registering mechanism for indicating and registering values involving a whole number disposed in each one of a plurality of successive denominational orders and at least one additional number which is less than the difference between two successive whole numbers in the lowest one of said denominational orders:

control means including a plurality of control units;

a respective indicator member constantly associated with each of said control units;

a first register member for said additional number;

a respective register member for each of said denominational orders;

indexing means for indexing said control means a successive step from a returned position each time the indexing means is actuated, thereby to index one of said control units into association with said first register member, to index any control unit associated with said first register member into association with the respective one of said register members for the lowest denominational order, and to index any control unit associated with one of said respective register members into association with the respective register member for the next higher denominational order;

said control means, when in the returned position, being disposed with one of said control units in association with said first register member;

value setting means operatively arranged, when actuated, for setting the control unit then associated with said first register member, thereby to control setting of the indicator member and register member associated therewith to a set position;

means operatively arranged for actuating said indexing means to index said control means one of said successive steps only when said value setting means is actuated to set one of said whole numbers; and means cooperable with the indicator members and located to designate the whole number set in any of said denominational orders and to designate said additional number when set.

18. A value entering mechanism for entering values involving a whole number disposed in each one of a plurality of successive denominational orders and at least one additional number which is less than the difference between two successive whole numbers in the lowest one of said denominational orders; said mechanism comprising:

control means including a plurality of control units;

each of said control units being operable to control entry of one of said numbers when set thereinto;

indexing means for indexing said control means a successive step from a returned position each time the indexing means is actuated, thereby to index one of said control units to a first location for said additional number, to index any one of said control units at said first location to a location for said lowest denominational order, and to index any one of said control units at a location for one of said denominational orders to a location for the next higher denominational order;

said control means, when in said returned position, being disposed with one of said control units at said first location;

value setting means operatively arranged, each time it is actuated, to set one of said numbers into the control unit then at said first location;

and means operatively arranged for actuating said indexing means to index said control means one of said successive steps only when said value setting means is actuated to set one of said whole numbers.

19. A mechanism as set forth in claim 18 wherein said value setting means comprises a keyboard including a group of keys each of which is arranged, when depressed, to set the control unit then at said first location and to actuate said indexing means;

and at least one additional key arranged, when depressed, to set the control unit then at said first location and to avoid actuation of said indexing means.

20. A mechanism as set forth in claim 19 including a key stem supporting each of said keys;

a lock-out plate providing openings through which said key stems extend;

means mounting said lock-out plate for movement along a path extending transversely of said key stems;

motion-translating means associated with said lock-out plate and the key stem supporting said additional key whereby depression of said additional key effects movement of said lock-out plate along said path from a first position to a second position;

an abutment carried by each of selected ones of said key stems;

said lock-out plate including portions located to engage said abutments and thereby prevent depression of said selected key stems when said locking plate is in said second position and located to permit depression of said selected key stems when said locking plate is in said first position;

and means for effecting return of said lock-out plate to said first position.

21. A mechanism as set forth in claim 20 wherein said keyboard includes operating cycle trip means and wherein each of said key stems carries one of said abutments;

and motion-translating means associated with said lock-out plate and said trip means whereby actuation of said trip means effects movement of said lock-out plate along said path to a third position beyond said second position from said first position;

said lock-out plate including portions located to engage all of said abutments and thereby prevent depression of all of said key stems when said locking plate is in said third position.

22. A mechanism as set forth in claim 18 wherein said value setting means comprises a keyboard including a group of keys each of which is arranged, when depressed, to set the control unit then at said first location and to actuate said indexing means;

and a conditioning key operatively arranged, when depressed, for actuation of said indexing means whereby subsequent depression of one of said group of keys results in setting of the control unit then at said first location without indexing of said control means.

23. A mechanism as set forth in claim 22 including a key stem supporting each of said keys;

a lock-out plate providing openings through which said key stems extend;

means mounting said lock-out plate for movement along a path extending transversely of said key stems;

motion translating means associated with said lock-out plate and the key stem supporting said conditioning key whereby depression of said conditioning key effects movement of said lock-out plate along said path from a first position to a second position;

an abutment carried by each of selected ones of said key stems;

said lock-out plate including portions located to engage said abutments and thereby prevent depression of said selected key stems when said locking plate is in said second position and located to permit depression of said selected key stems when said locking plate is at said first position;

and means for effecting return of said lock-out plate to said first position.

24. A mechanism as set forth in claim 23 wherein said keyboard includes operating cycle trip means and wherein each of said key stems carries one of said abutments;

and motion-translating means associated with said lock-out plate and said trip means whereby actuation of said trip means effects movement of said lock-out plate along said path to a third position beyond said second position from said first position;

said lock-out plate including portions located to engage all of said abutments and thereby prevent depression of all of said key stems when said locking plate is in said third position.

References Cited in the file of this patent

UNITED STATES PATENTS

| | | |
|---|---|---|
| 800,210 | Hinchman | Sept. 26, 1905 |
| 3,100,602 | Lear Voo | Aug. 13, 1963 |